Patented Dec. 22, 1936

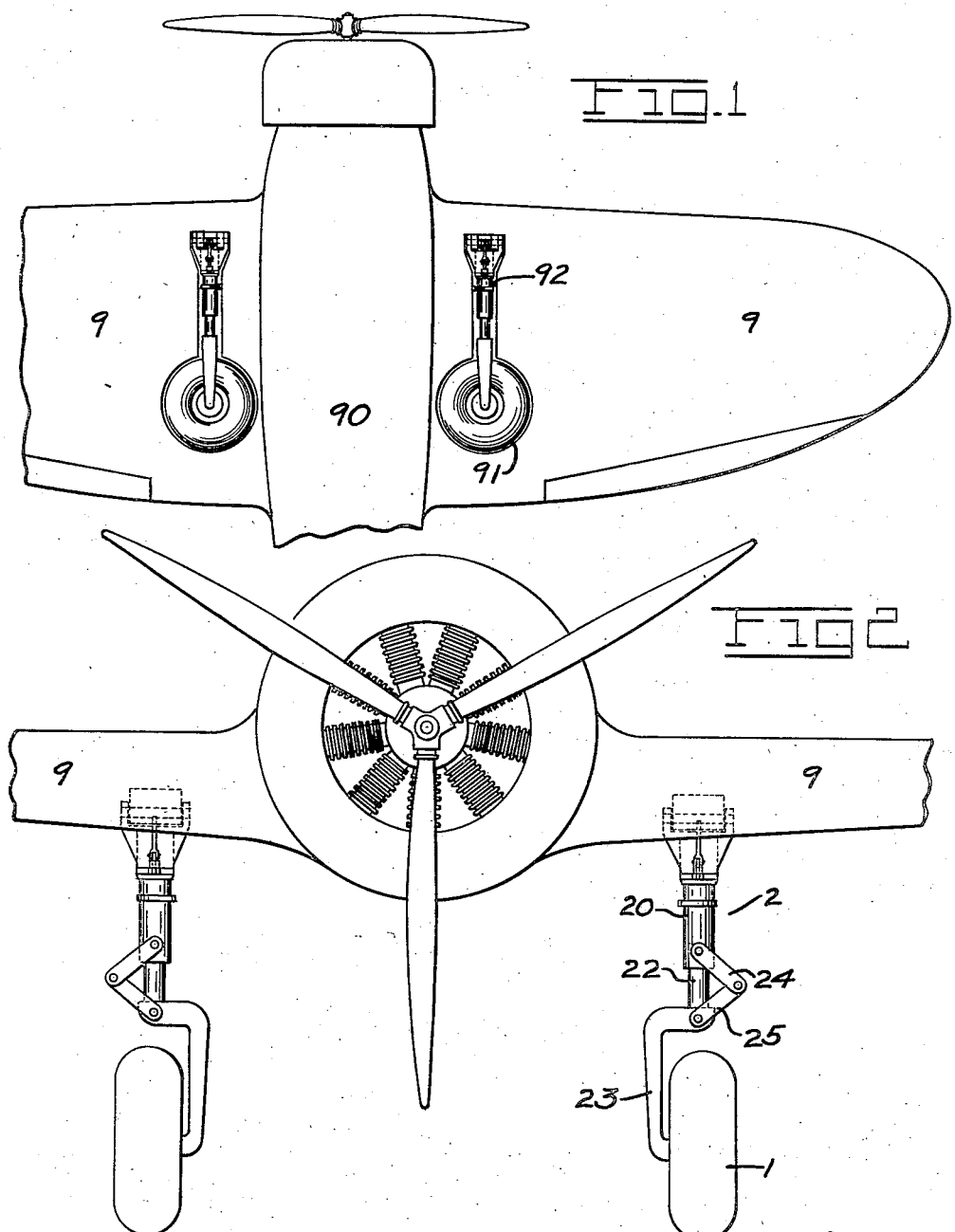

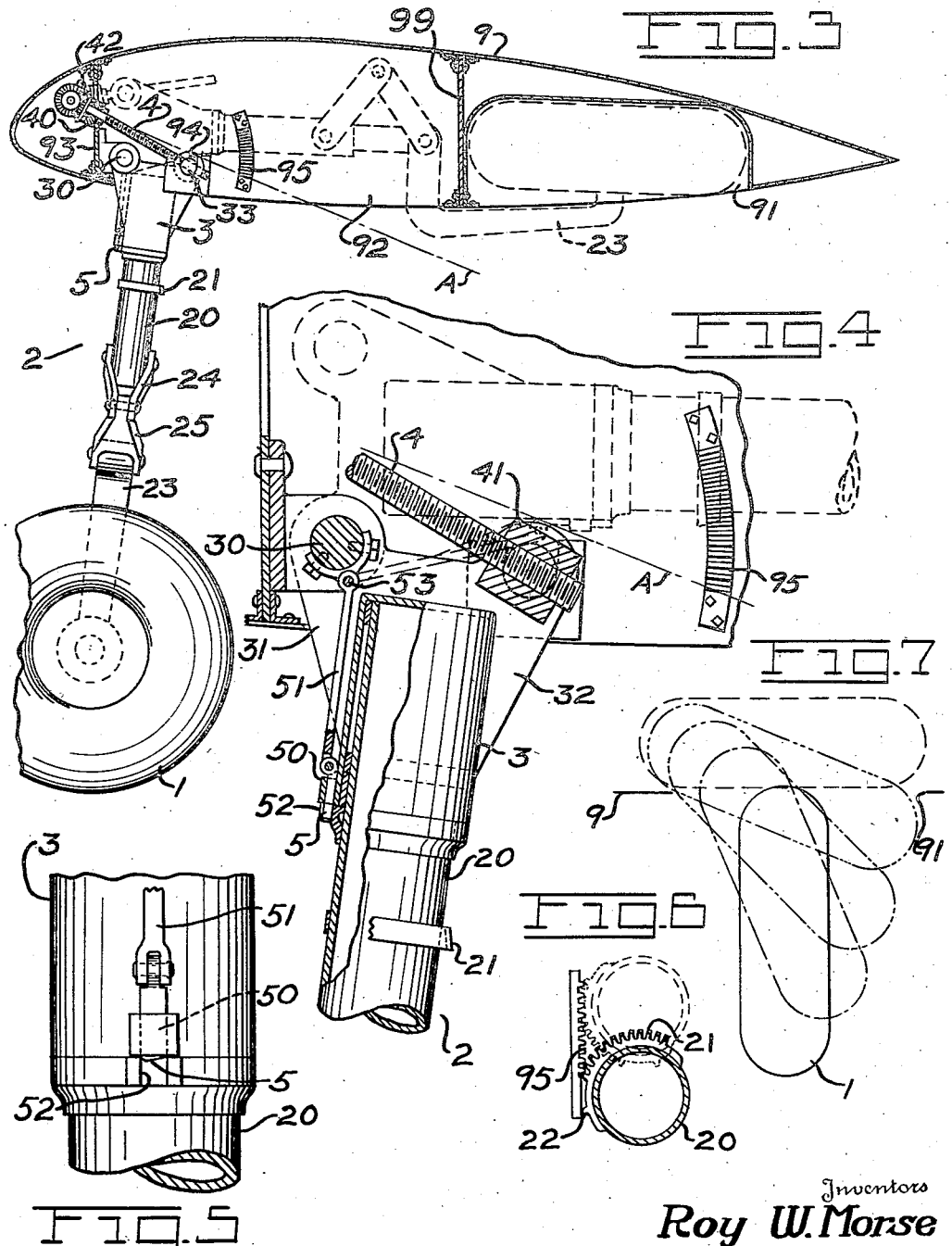

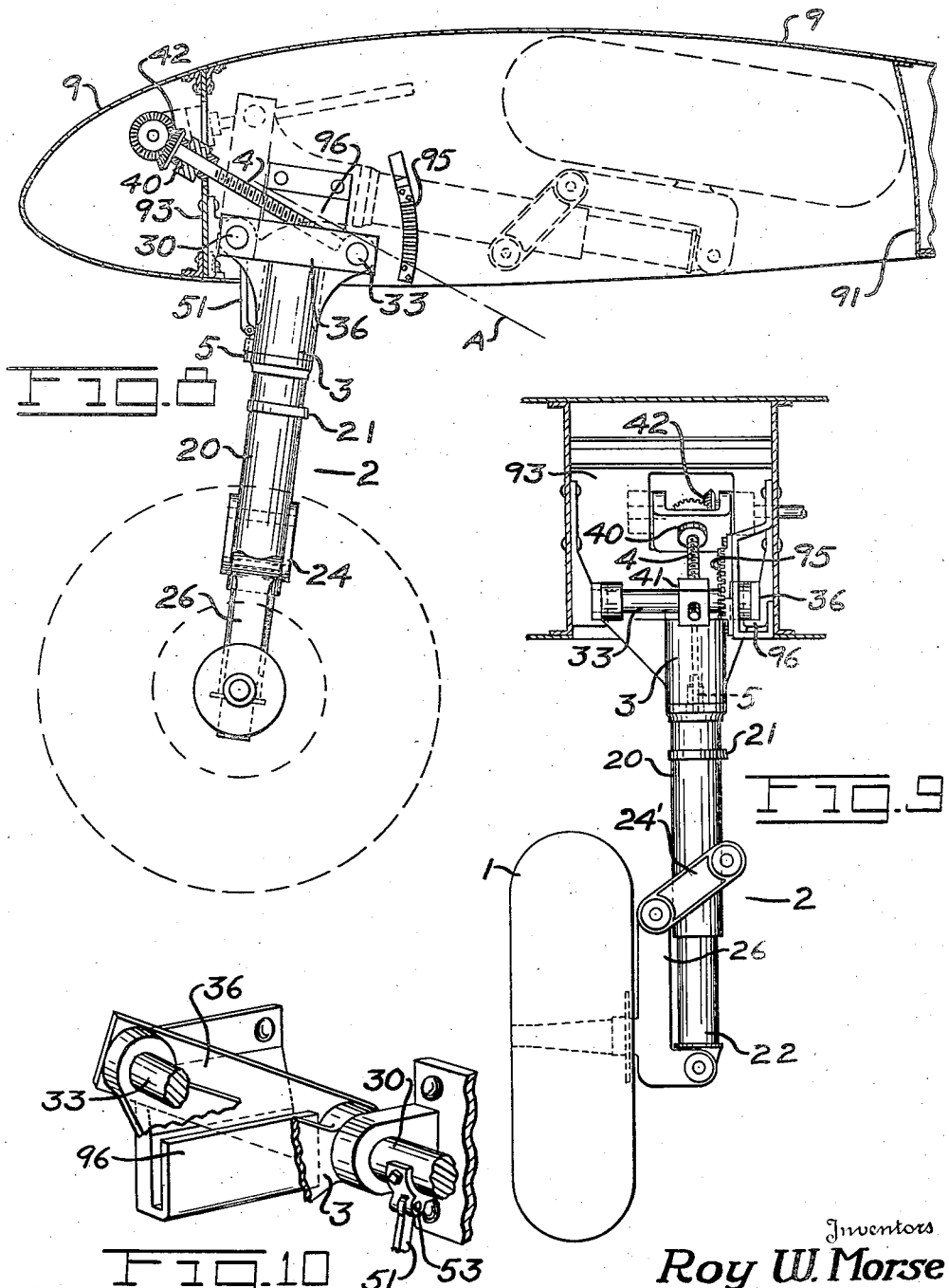

2,065,146

UNITED STATES PATENT OFFICE 2,065,146

RETRACTABLE LANDING GEAR

Roy W. Morse and Lysle A. Wood, Seattle, Wash., assignors to Boeing Airplane Company, Seattle, Wash., a corporation of Washington Application May 22, 1933, Serial No. 672,118

34 Claims. (Cl. 244—102)

This invention relates in general to the landing gear of airplanes.

One of the principal objects of the invention is to provide a landing gear which is extremely light and simple in construction, and which is in effect a single cantilever leg, and a further object is to provide such a cantilever leg which can be retracted.

In another aspect it is an object of this invention to provide a simple retractable landing gear, preferably one which is swingable in a longitudinal plane, wherein the landing gear as a whole, or at least the wheel thereof, can be rotated about an axis which extends substantially radially of the pivot axis referred to, to bring the wheel, in retracted position, into a plane substantially parallel to and preferably within a recess in the underside of the airplane structure, for instance the aerofoil or wing.

A further object is to provide a retractable landing gear of the general type explained above, which will not require extraneous transverse or longitudinal bracing.

It is a further object to provide a retractable landing gear which can be incorporated in or associated with a wing of relatively slight thickness, yet can be entirely or nearly completely retracted within the wing.

It is still a further object to provide a landing gear comprising a single leg formed in two telescoping parts, and to provide such parts with simple means to resist torsional stresses tending to rotate one part relative to the other.

Other objects, especially such as refer more particularly to the structural details of this invention, or to a particular mode of operating the same, will be best understood by reference to the following specification.

This invention comprises the novel parts and the novel combination and arrangement thereof, as shown in the accompanying drawings, described in this specification, and as will be particularly defined by the claims terminating the same.

In the accompanying drawings the invention is shown incorporated in typical airplane structures, and in forms which illustrate preferred embodiments thereof.

Figure 1 is an underside plan view of a portion of an airplane incorporating this landing gear, the landing gear being shown in retracted position.

Fig. 2 is a front elevation of such a plane, the landing gear being shown in landing position.

Figure 3 is a section through a wing, illustrating the landing gear in elevation.

Figure 4 is a detail elevation of the landing gear support, parts being broken away and shown in section.

Figure 5 is a detail elevation of the locking means to prevent rotational movement.

Figure 6 is a detail view, showing the means to accomplish rotational movement.

Figure 7 is a diagram of the motion of the wheel during rotational movement.

Figure 8 is a view similar to Figure 3, showing a slightly modified form of landing gear and support, and Figure 9 is a rear elevation of the same.

Figure 10 is a detail perspective view of the form of support for the landing gear which is illustrated in Figures 8 and 9.

Fighter military planes must be light in order to secure maximum performance and the ability to carry the maximum military load. To attain these ends, and for other reasons, the wings are held to a minimum thickness, consistent with the requisite strength. It is desirable that the landing gears for such planes be retractable, in order to reduce the drag thereof, but the type of landing gear which has been found most satisfactory is one which swings about a transverse horizontal pivot axis. It has heretofore been thought necessary, however, to brace such landing gear in a longitudinal direction, and usually in a transverse direction as well, which not only added to the weight, but the longitudinally extending bracing was of such length as to render it impossible to retract it within the thin wing. Furthermore, the landing wheel, disposed in a longitudinal plane, would in any event project somewhat below the lower skin of the wing, even though the wing were of considerable depth.

In order to avoid the longitudinal bracing, and to eliminate the necessity of transverse bracing when it is preferred to omit it, and therefore to enable retraction within such a thin wing by swinging in a longitudinal plane, the landing gear, according to this invention, is formed preferably of a single cantilever leg supported by means spaced at opposite sides of its upper end, the one a pivot support upon the inside of the wing, and the other a support such as trunnions cooperating with sockets fixed upon the wing, and with the pivot support, to resist longitudinal, transverse and torsional stresses upon the leg, and this leg may be swung about its pivot by means which brace it and which resist upwardly directed stresses. These retracting means may be sufficiently small and light to be built into the leading edge within the upper and lower skins of the wing.

To avoid the projection of the wheel below the wing, the leg is so mounted with respect to the pivot support referred to, or at least the wheel is so mounted, that during movement into retracted position it is rotated about an axis extending substantially radially of the pivot axis, through about 90°, until in the retracted position it lies in a plane substantially parallel with the lower skin of the wing, and preferably within a recess in the wing. In connection with such rotational movement of the wheel it is not essential that longitudinal or lateral bracing be omitted, but usually in wings so thin as to make rotation of the wheel desirable, there is not sufficient thickness to house longitudinal bracing, at least.

Rotational movement is preferably accomplished automatically by and during retracting movement, preferably though not necessarily during the latter part thereof, so that there is no chance of its disturbing the balance of the airplane. Similarly, during projection of the landing gear into landing position the wheel is again rotated into its normal longitudinal plane by and during the projecting movement. Suitable locking means are provided to retain the wheel in landing position, these locking means being preferably releasable by the action of swinging the wheel and landing gear into retracted position and prior to the commencement of the rotational movement of the wheel. They are similarly automatically reengaged as the landing wheel approaches its landing position.

It is essential that shock absorbing means be provided in such a landing gear, and the single leg is formed of two parts, an upper part incorporating the cylinder of an oleo shock absorber or like unit, and the lower part being associated with the piston thereof, and in order to provide means to prevent rotational movement of the lower part relative to the upper part, links are provided pivotally connected to the upper and to the lower parts, whereby such torsional stresses are resisted.

The fuselage 90 of an airplane is supported by wings 9, in the under side of which wings are provided recesses consisting of a circular portion 91 and a narrow portion 92. The wing is constructed in any usual manner, the details of construction thereof being omitted, except as there is illustrated a front spar 93. With the exception of the recesses 91 and 92, the airplane structure does not or need not depart appreciably from known structures.

The landing wheel 1 is supported at the lower end of a landing leg, generally indicated by the numeral 2. This leg, or a support or sleeve 3 which supports its upper end for rotational movement, is pivotally supported at 30 upon the airplane structure, for instance, upon the wing spar 93. Any suitable means may be provided for swinging the landing leg 2 with its wheel 1 about the pivot 30, and to this end there is illustrated a screw 4, journaled and swiveled at 40 in the wing spar 93 or other convenient portion of the airplane structure, and somewhat above the pivot 30, this screw being threaded within a nut 41 which is swiveled upon an axis parallel to the pivot axis 30, and spaced at the opposite side of the sleeve 3 from the pivot axis (see Figure 4).

Rotation of the screw 4, effected by means such as the bevel gears 42, accomplishes swinging movement of the leg 2 and its wheel 1 about the pivot pin 30.

In the preferred construction the sleeve 3 receives the upper end of the leg 2 for rotational movement of the latter, and the sleeve is provided with pivot ears 31 in which the pivot pin 30 is received, and also with ears 32 disposed at the opposite side of the sleeve, from the opposite sides of which ears 32 project trunnions 33 (see Figure 3). In the landing position these trunnions 33 are each received within a socket 94 supported rigidly with the airplane structure, and of such depth that with the trunnions held in the socket by the screw 4 the trunnions 33, in conjunction with the pivot pin 30, resist all longitudinal, transverse and torsional stresses imposed upon the leg, and the screw 4, as has been noted above, resists upward stresses, that is, stresses axially of the leg, or tending to swing it upward on its pivot pin 30. This produces a cantilever mounting for the leg, whereby it may be made light and does not require braces which are heavy and which require room in which to retract them.

Any suitable means may be provided for rotating the leg and/or wheel, and for locking it against rotation and for releasing it. Those which are described below are typical of a possible arrangement, though not necessarily a preferred one.

Upon the rotatable member 20 of the leg 2, which member 20 is rotatable about its own axis within the sleeve 3, there is secured a segment gear 21, which as the landing gear swings about the pivot 30, and preferably as it approaches its retracted position, will engage a fixed rack bar 95 fixed relative to the airplane structure, and positioned within the narrow slot 92 in the underside of the aerofoil. The segment gear 21 is so disposed, as may be seen in Figure 6, that it will, upon engagement with the rack bar 95, effect rotation of the member 20 through substantially 90°. A stop tooth 22 by its engagement with the end of the rack bar 95 insures disposition of the gear segment 21 in proper position to engage with the rack bar and to accomplish exactly the required amount of turning, and since the segment gear remains in mesh with the rack bar, excess rotational movement is prevented, and the wheel, which by this action is turned through 90° into a horizontal plane, is prevented from departing from this plane until the leg is again swung downward. In swinging downward the stop tooth 22 engages the end of the fixed rack bar, and insures stopping the rotational movement in the proper position of the wheel, at which time a lock bolt 5, slidable at 50 in the sleeve 3, engages within a slot or recess 52 in the rotatable member 20, and locks the member against further rotation.

The engagement and release of this lock bolt 5 are preferably accomplished by and during the swinging movement of the landing leg, and to this end a link 51 may be connected to the bolt 5, its other end being pivotally connected at 53 somewhat eccentrically of the axis of the pivot pin 30, whereby as the landing leg swings upwardly, the bolt 5 is released just in time to permit rotation of the member 20 in the manner and by means such as those previously described, and upon swinging downward into landing position the locking bolt 5 reengages its notch 52 prior to release of the stop tooth 22 from the fixed rack bar 95.

It will be evident that the wheel does not commence its rotational movement until a considerable part of the swinging movement has been completed. Thus in Figure 7 the wheel is shown in solid lines at the commencement of its rotational movement, though it has already completed the major part of its upward movement. From this position it is further swung upward to enter the recess 91. The axis of the landing leg 2 is at this time in the position indicated by the dot-and-dash line A in Figures 3, 4 and 8, and during the last 20° of upward swinging movement the wheel is rotated from a position in a vertical longitudinal plane into a horizontal plane, as shown by the dash lines in Figure 7, in which position it is wholly retracted within the recess 91.

The rotatable member 20 of the leg may incorporate the cylinder of an oleo shock absorbing unit or any equivalent shock absorbing device. Telescopically received within its lower end is a member 22 with which is associated the piston of such an oleo shock absorbing unit. Since such structures are well known in the art the oleo unit is not further illustrated in the present drawings. The wheel 1 is therefore supported from the member 22, and in the form shown in Figures 1, 2 and 3 a gooseneck support 23 is employed, whereby the plane of the wheel is brought into line with the axis of the landing leg 2, and whereby the wing recess in which the wheel is housed may be located behind the rear spar 99, and the latter may continue through unbroken. When the wheel is rotated into the position shown in dash lines in Figure 3 the gooseneck 23 is the only member of the landing gear which projects below the lower skin of the aerofoil 9. In order to prevent torsional movement between the telescoping members 20 and 22 there are provided links 24 and 25, one being pivotally connected to the member 20 and the other to the member 22, and being pivotally connected to each other. These links, therefore, resist torsional movement of the member 22 and its wheel 1 relative to the member 20.

In the form shown in Figures 8 and 9 the gooseneck 23 is omitted, and the wheel is supported upon a spindle body 26 which is disposed at one side of the member 22 and is pivotally connected to its lower end. The torsional effect is resisted by a link 24' pivoted to the member 20 and to the upper end of the spindle body 26. This shortens the leg as a whole, and the wheel can usually be swung up into retracted position ahead of the rear spar.

In lieu of the trunnions 33 and their sockets 94, as a means of resisting transverse, longitudinal and torsional stresses upon the landing leg as a whole, there is provided in Figures 8, 9 and 10 a slightly modified arrangement. Upon the ends of the trunnions 33, and extending between these trunnions and the end of the pivot pin 30, are plates 36, which plates are receivable in channels 96 rigidly supported from the airplane structure. The plates 36 drop into these channels and seat firmly therein when the landing gear is in landing position, and these plates, then, being directly connected through the trunnions 33 and the pivot pin 30 to the upper end of the landing leg, strongly resist transverse and torsional stresses, while the pivot pin 30 resists longitudinal stresses.

What we claim as our invention is:

1. A retractable landing gear, in combination with an airplane structure, said landing gear including a ground wheel disposed, in landing position, in a longitudinal plane, means supporting the landing gear from said airplane structure, means to move said landing gear and wheel upwardly in such longitudinal plane relative to the airplane structure into retracted position, and means operable during such movement to move the wheel relative to the supporting means to leave the wheel, at the end of the retracting movement, in a substantially horizontal plane.

2. In combination with a sheathed airplane structure, a retractable landing gear including a ground wheel disposed in landing position, in a longitudinal plane, means to move the landing wheel, in such plane, into retracted position, and means operable during such movement to move the wheel, to leave it, at the end of such retracting movement, substantially in the plane of the sheathing of said airplane structure.

3. A retractable landing gear, a pivot support therefor disposed substantially horizontally, means to swing the landing gear about such pivot support into and from retracted position, and means operable as the landing gear approaches retracted position to rotate the same bodily through about 90° about an axis disposed substantially radially of the pivot support.

4. A retractable landing gear including a ground wheel, a pivot support for the landing gear disposed substantially horizontally, means to swing the landing gear about said pivot support into and from retracted position, and means operable after the landing gear has departed from landing position to rotate the wheel about an axis extending substantially radially of the pivot support, through substantially 90°, to leave it, in retracted position, in a substantially horizontal plane.

5. In combination with an airplane structure, a retractable landing gear therefor, means for moving said landing gear in a longitudinal plane, and means to rotate said landing gear bodily during such movement.

6. A retractable landing gear including a landing wheel, a pivot support for the landing gear disposed substantially horizontally, means to swing the landing gear about its pivot support into and from retracted position, means operable during retracting movement to rotate the wheel relative to an axis extending substantially radially of the axis of the pivot support, and locking means to prevent rotation of the wheel while in landing position, and automatically releasable by and during retracting movement.

7. A retractable landing gear comprising a cantilever leg, means supporting the upper end of said leg for rotation about its own axis and for swinging about an axis disposed angularly relative to the first axis, a landing wheel supported at the lower end of said leg, means to swing said leg about the second axis into and from retracted position, and means to rotate said leg, and the wheel carried thereby, about said first axis.

8. A retractable landing gear comprising a single leg, a sleeve supporting the upper end of said leg for rotation about its own axis, said sleeve being pivotally mounted upon a transverse horizontal axis, a landing wheel supported at the lower end of said leg, means to swing said leg about the transverse horizontal axis from and into retracted position, means to rotate the leg and wheel relative to said sleeve about the first axis, through substantially 90°, by and during such swinging movement, a locking device engageable between the leg and sleeve when the leg is in landing position, and means operable during retracting movement to disengage said locking means to permit rotation of the leg and operable during projecting movement to re-engage the locking means to prevent such rotation.

9. A retractable landing gear comprising a single leg, a sleeve supporting the leg for rotation about its own axis, and itself supported for swinging about a horizontal axis, means to swing the leg and sleeve about the horizontal axis, a fixed rack bar, a gear segment carried by said leg in position to engage said rack bar, thereby to effect rotation of the leg during swinging movement of the leg.

10. In combination with an airplane structure, a retractable landing gear comprising a substantially vertical leg, a landing wheel supported at its lower end, a substantially horizontal pivot support at its other end, supporting the same from the airplane structure, means to swing the leg about said pivot support, and means associated with the upper end of the leg and spaced from the pivot support, engageable with complemental means on the airplane structure when the landing gear is in landing position, to form a cantilever support for said leg.

11. In combination with an airplane structure, a retractable landing gear comprising a single leg, two supports spaced at opposite sides of the upper end of said leg, one of said supports pivotally engaging complemental means upon the airplane structure, along a substantially horizontal axis, whereby the landing gear may swing into retracted position, and therefrom, means upon the airplane structure complemental to the second of said supports, and engaged therewith when the landing gear is in landing position, said second support and its complemental means being disposed and arranged to resist torsional, longitudinal, and transverse stresses on the landing gear, and means to retract and project said landing gear.

12. The combination of claim 11, the retracting means being formed and arranged to resist upward stresses on the landing gear.

13. In combination with an airplane structure, a retractable landing gear comprising a single leg, pivot ears disposed at one side of the upper end of said leg, a pivot pin received in said ears and fixed in said airplane structure, trunnions disposed at the opposite side of the upper end of said leg, sockets receiving said trunnions when the landing gear is in landing position, thereby, in conjunction with the pivot pin and ears, resisting all stresses on said leg other than those axially directed, and further means resisting such axially directed stresses.

14. In combination with an airplane structure, a retractable landing gear comprising a single leg, pivot ears disposed at one side of the upper end of said leg, a pivot pin received in said ears and fixed in said airplane structure, trunnions disposed at the opposite side of the upper end of said leg, sockets receiving said trunnions when the landing gear is in landing position, thereby, in conjunction with the pivot pin and ears, resisting all stresses on said leg other than those axially directed, a screw and nut device extending between the trunnions and the airplane structure, to retain the trunnions within their sockets and to resist axially directed stresses, and operable to swing the leg about the axis of said pivot pin into and from retracted position.

15. A landing gear comprising a leg consisting of an upper part and a lower part relatively longitudinally movable, and shock absorbing means interposed between the two, a landing wheel, a spindle body pivoted at its lower end to the lower part of the leg, and including a spindle disposed above such pivot connection and receiving the landing wheel, and a torsion link connected to said spindle body and to the upper part of the leg.

16. In combination with an airplane structure including a rear wing spar, a landing leg pivotally supported on the airplane structure and including shock absorbing means, a landing wheel mounted at its lower end, means to swing the landing leg and wheel upwardly into retracted position, the leg including a gooseneck, and being of such length and so mounted upon the airplane, that the gooseneck, in retracting, straddles the rear spar, to dispose the shock absorbing means ahead of the spar, and the wheel behind the same.

17. A cantilever-type airplane landing gear, comprising an upright leg, two substantially parallel spaced members fixed in positions normal to said leg and secured to the upper end thereof, and socket means immovably secured on the airplane and receiving said members to prevent swinging thereof relatively to the airplane under torsional stresses produced in said leg.

18. A cantilever-type airplane landing gear, comprising an upright leg, two substantially parallel rods fixed in positions normal to said leg and secured to the upper end thereof spaced in a substantially horizontal plane, and socket members mounted on the airplane and receiving the ends of said rods to resist torsional and other stresses produced in said leg.

19. An airplane landing gear comprising a single leg, including an upper part mounted on the airplane structure and a lower part movable longitudinally relatively to the upper part, a landing wheel supported from the lower part of said leg, two links, and a free pivot interconnecting an end of each link, the other end of one link being pivotally connected only to the upper part of said leg and the other end of the other link being pivotally connected only to the lower part of said leg, to resist rotational movement of one part relative to the other.

20. A cantilever type airplane landing gear, comprising an upright leg, substantially parallel rods secured to the upper end of said leg spaced in a substantially horizontal plane, spaced bars interconnecting corresponding ends of said rods, and channel members on the airplane receiving said spaced bars to resist stresses produced in said leg.

21. A retractable cantilever type airplane landing gear, comprising an upright leg swingable about an axis at its upper end fixed with respect to the airplane between retracted and landing positions, an elongated member rigidly secured to the leg in a position transversely thereof and swingable therewith about said fixed axis, and a cooperating elongated channel member on the airplane to receive and embrace closely said first member along its length upon swinging of the leg to landing position, thereby to prevent turning of the leg relatively to the airplane under torsional stresses produced in said leg.

22. A retractable landing gear for an airplane comprising a normally upright leg, a pivot member mounted upon the airplane in definitely fixed relation thereto, extending transversely of said leg and supporting the upper end thereof, means to swing said leg upward about said fixed pivot member, and means to rotate said leg substantially about its own axis.

23. A retractable landing gear for an airplane comprising a normally upright leg, a pivot member mounted upon the airplane in definitely fixed relation thereto, extending transversely of said leg and supporting the upper end thereof, means to swing said leg upward about said fixed pivot member, and means to rotate said leg substantially about its own axis during upward swinging movement thereof.

24. A retractable landing gear for an airplane, comprising a normally upright leg, a leg support receiving the upper end thereof, a pivot rod disposed substantially horizontally and supporting said leg support from the airplane, means to swing the leg support and leg about said pivot rod into and from retracted position, and means operable during such swinging movement to rotate the leg relatively to the leg support.

25. In aircraft, a wing having a recessed lower surface for reception of a retractable landing gear, a retractable landing gear comprising a strut transversely pivoted to said wing for fore and aft swinging, an offset bracket carried by said strut, a wheel journaled to said bracket, the plane of rotation of said wheel being coplanar with said strut, and means for swinging said strut and turning said wheel about said strut axis to a retracted position within said recess, the outer face of said wheel when retracted lying substantially flush with the lower face of said wing, and said strut lying within said recessed lower surface.

26. In a retractable landing gear for aircraft, a shaft transverse to the line of flight, a landing gear including a wheel swingable on said shaft between an extended substantially vertical position and a retracted substantially horizontal position, and means for rotating the wheel about an axis substantially at right angles to the axis of said shaft during retraction to cause said wheel to lie in a substantially horizontal plane when fully retracted.

27. A retractable landing gear, in combination with an airplane structure, said landing gear including a ground wheel disposed, in landing position, in a longitudinal plane, means supporting the landing gear from said airplane structure, means to move said landing gear upwardly in such longitudinal plane relative to the airplane structure into retracted position and means operable during such movement to move the wheel relative to the supporting means to leave the wheel, at the end of the retracting movement, in a substantially horizontal plane.

28. In a retractable landing gear, a wheel carrying strut hinged for substantially fore and aft swinging and rotatably carried for turning about its own axis, and means for simultaneously swinging and turning said strut between an extended position wherein said wheel is in the plane of flight and said strut is substantially vertical, and a retracted position wherein said strut and the plane of said wheel are substantially horizontal.

29. In aircraft, a wing having a recess formed in the lower surface thereof, a transverse shaft within said recess, a yoke swingable on said shaft having a bearing the axis of which is substantially normal to said shaft, a landing strut rotatable in said bearing and swingable with said yoke, and means for simultaneously rotating and swinging said strut between an extended position below said wing and a retracted position within said recess.

30. In aircraft, a wing having a recessed lower surface for reception of a retractable landing gear, a retractable landing gear comprising a strut transversely pivoted to said wing for fore and aft swinging, an offset bracket carried by said strut, a wheel journaled to said bracket, the plane of rotation of said wheel being coplanar with said strut, and means for swinging said strut and turning said wheel about said strut axis to a retracted position within said recess, one face of said wheel when retracted lying substantially flush with the lower face of said wing, and said strut lying within said recessed lower surface.

31. In aircraft, a retractable landing gear comprising a member hinged for swinging on a pivot carried by said aircraft, said member being swingable between extended and retracted positions, a strut extending from said member and mounted for turning relative thereto on an axis angularly divergent from said swinging axis, means to simultaneously swing said member and strut and to turn said strut relative to said member, and a landing element carried by said strut.

32. In an aircraft retractable landing gear, a strut hinged for substantially fore and aft swinging on said aircraft, and for turning about its own axis during swinging movements, means for swinging said strut between extended and retracted positions, and means operative in response to extension or retraction for simultaneously turning said strut on its own axis.

33. In an aircraft retractable landing gear, a strut hinged for substantially fore and aft swinging on said aircraft, and for turning about its own axis during swinging movements, means for swinging said strut between extended and retracted positions, and means operative in response to extension or retraction for simultaneously turning said strut on its own axis, said means comprising a pair of engaging gears, one of the pair being mounted on the strut and the other of the pair being mounted on the aircraft.

34. In an aircraft retractable landing gear, a strut hinged for substantially fore and aft swinging on said aircraft, and for turning about its own axis during swinging movements, means for swinging said strut between extended and retracted positions, means operative in response to extension or retraction for simultaneously turning said strut on its own axis, said means comprising a pair of engaging gears, one of the pair being mounted on the strut and the other of the pair being mounted on the aircraft, and a wheel carried by said strut and movable therewith between extended and retracted positions, said wheel and strut, when retracted, lying in a substantially horizontal plane, and when extended, lying in a substantially vertical fore and aft plane.

ROY W. MORSE.
LYSLE A. WOOD.

DISCLAIMER 2,065,146. *Roy W. Morse* and *Lysle A. Wood*, Seattle, Wash. RETRACTABLE LANDING GEAR. Patent dated December 22, 1936. Disclaimer filed September 14, 1937, by the assignee, *Boeing Aircraft Company*.

Hereby disclaims from claims 3, 7, 9, 22, 23, 24, and 31, as being outside the scope of the invention and outside the proper scope of such claims, the therein claimed subject-matter except when the parts are so arranged that the rotation of the leg during its swinging leaves the wheel or other ground-engaging member carried by the swinging end of the leg, when parts have reached retracted position, substantially flush with the under surface of the wing or other aircraft structure against which it folds.

Your petitioner further disclaims claim 19 in its entirety.

[*Official Gazette October 12, 1937.*]